No. 700,784. Patented May 27, 1902.
A. L. KULL.
AUTOMOBILE.
(Application filed Mar. 22, 1901. Renewed Dec. 9, 1901.)
(No Model.)
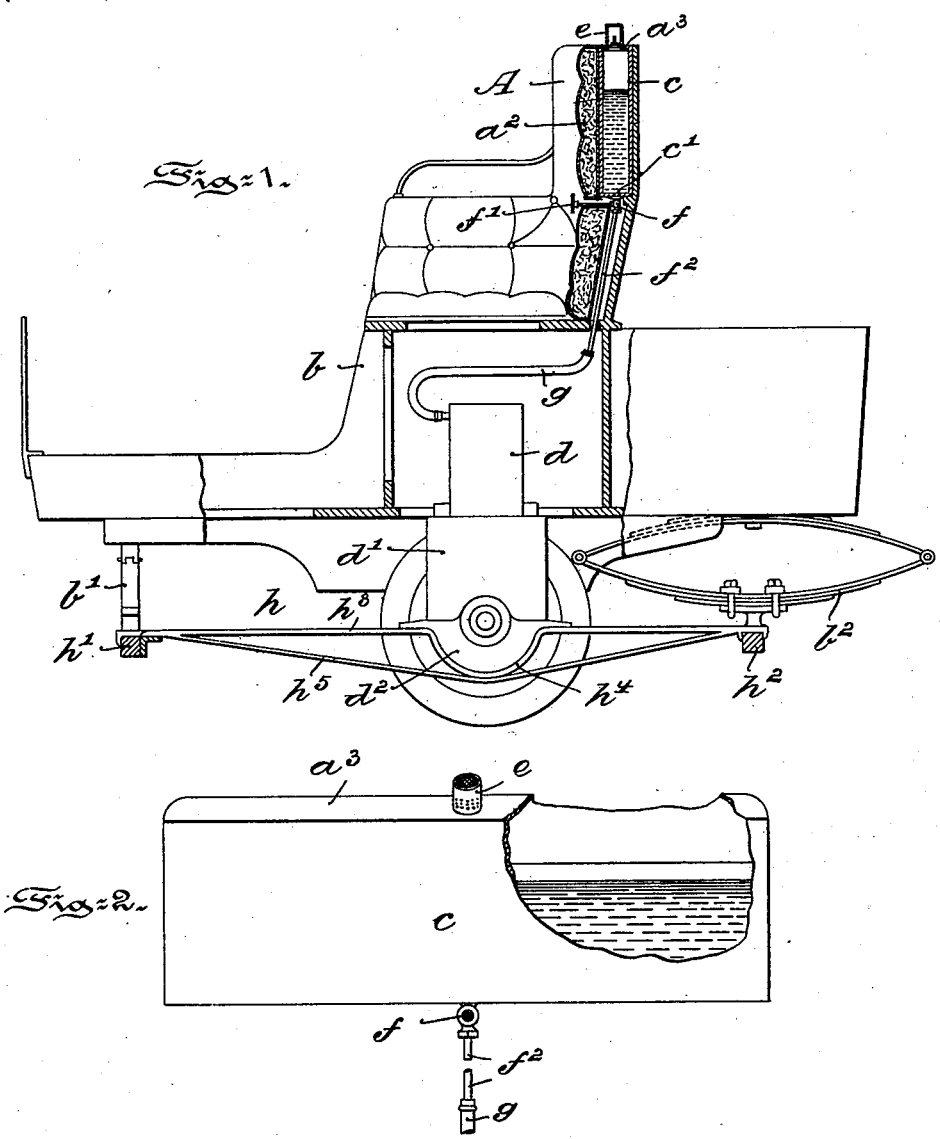

United States Patent Office.

ALBERT L. KULL, OF CAMDEN, NEW JERSEY.

AUTOMOBILE.

SPECIFICATION forming part of Letters Patent No. 700,784, dated May 27, 1902.

Application filed March 22, 1901. Renewed December 9, 1901. Serial No. 85,250. (No model.)

*To all whom it may concern:*

Be it known that I, ALBERT L. KULL, a citizen of the United States, residing at Camden, in the county of Camden and State of New Jersey, have invented certain new and useful Improvements in Automobiles, of which the following is a specification.

My invention has relation to an automobile or similar vehicle; and in such connection it relates to the construction and arrangement of parts whereby the motor or explosive-engine may be firmly supported upon the frame of the vehicle; and whereby the mixing and explosion chambers may be arranged within the body of the vehicle and fed from a tank conveniently located within the back of the seat of the vehicle.

The principal object of my invention is to so arrange the parts of an automobile or similar motor-vehicle adapted to be driven by an engine of an explosive type that the engine may be directly and rigidly supported upon the framework connecting the axles of the vehicle and the mixing and explosion chambers of the engine may extend into the body of the vehicle and be supplied from a tank or receptacle carried at or within the back of the seat and with a flexible or yielding connection from the tank with the engine.

The nature and scope of my invention will be more fully understood from the following description, taken in connection with the accompanying drawings, forming part hereof, in which—

Figure 1 is a longitudinal sectional view of the upper portions of an automobile embodying main features of my invention; and Fig. 2 is an enlarged perspective view of a tank or receptacle removed from the vehicle, the rear wall of which tank or receptacle is broken away to expose a portion of the interior thereof.

Referring to the drawings, A represents the seat-back or lazy-rest of the vehicle, and $b$ represents the body of the vehicle supporting the seat and its back. Preferably concealed within the back A is arranged the tank or receptacle $c$, containing oil or other fuel to be used in the engine. The front wall of this tank $c$ is preferably covered by the cushion $a^2$, constituting the seat-back, and the rear wall of the tank $c$ is properly sheathed by the woodwork of the seat-back A. The top wall $a^3$ of the tank $c$ is preferably exposed, and from this top wall projects a vent $e$ of any suitable construction. Within the body $b$ extend the mixing and explosion chambers $d$ of the engine $d'$. The engine $d'$ is not connected to the body $b$, but is firmly supported upon the frame $h$, connecting the front and rear axles $h'$ and $h^2$ of the vehicle. This frame $h$ preferably comprises a series of longitudinal truss-like braces, each having a top or horizontal member $h^3$, bowed or bellied downwardly, as at $h^4$, to receive the bearings $d^2$ of the engine, and a lower arch-like member $h^5$ spanning the ends of the horizontal member $h^3$ and the base of the downwardly-bent portion $h^4$ of the member $h^3$. The engine $d'$ is thus supported upon a very light yet very rigid framework. The body $b$ is not supported upon the framework for the engine $d'$, but is supported at either end upon springs $b'$ and $b^2$, which in turn are supported directly by the axles $h'$ and $h^2$ of the vehicle. The tank or receptacle $c$ has an outlet-opening $c'$, controlled by a valve $f$ in a pipe $f^2$, extending from the opening $c'$ and connected by a hose $g$ or other flexible connection with the chamber $d$ of the engine $d'$. A handle $f'$, controlling the valve $f$, projects preferably through the cushioned back $a^2$ of the seat, so as to be readily accessible to the hand of the operator.

Having thus described the nature and objects of my invention, what I claim as new, and desire to secure by Letters Patent, is—

1. In an automobile or similar motor-vehicle, a frame, consisting of longitudinally-arranged truss-like braces, each brace, consisting of an upper horizontal member, bowed or bellied downward to receive the bearings of an explosive-engine, and a lower arch-like member spanning the ends of the upper horizontal member and supporting the bowed portion thereof, a front and rear axle connected by said frame, a body supported directly upon the axles, an oil tank or receptacle supported on said body, an engine supported directly by the frame, and a flexible connection between the tank and the engine, substantially as and for the purposes described.

2. In an automobile or similar motor-vehicle, a frame, consisting of truss-like braces arranged to connect the axles of the vehicle, each brace being downwardly bowed, an engine having its bearings supported by the bowed portion of the braces, a body supported directly upon the axles and disconnected from the frame, a tank or receptacle carried by the body, mixing and explosion chambers for the engine, projecting upward from the engine into the body of the vehicle and a flexible connection extending from the mixing and explosion chambers to the tank or receptacle, substantially as and for the purposes described.

3. In an automobile or similar motor-vehicle, a frame provided with braces arranged to connect the axles of the vehicle, an engine supported by said braces, a body carrying a tank or receptacle, mixing and explosion chambers for the engine extending therefrom into the body of the vehicle, and a flexible connection from the mixing or explosion chambers to said tank or receptacle, substantially as and for the purposes described.

In testimony whereof I have hereunto set my signature in the presence of two subscribing witnesses.

ALBERT L. KULL.

Witnesses:
J. WALTER DOUGLASS,
THOMAS M. SMITH.